US007695687B2

(12) United States Patent

Delamarche et al.

(10) Patent No.: US 7,695,687 B2
(45) Date of Patent: Apr. 13, 2010

(54) CAPILLARY SYSTEM FOR CONTROLLING THE FLOW RATE OF FLUIDS

(75) Inventors: Emmanuel Delamarche, Thalwil (CH); Heinz Schmid, Waedenswil (CH); David Juncker, Montreal (CA)

(73) Assignee: International Business Machines Corporation, Armonk, NY (US)

( * ) Notice: Subject to any disclaimer, the term of this patent is extended or adjusted under 35 U.S.C. 154(b) by 887 days.

(21) Appl. No.: 11/427,811

(22) Filed: Jun. 30, 2006

(65) Prior Publication Data

US 2008/0003572 A1 Jan. 3, 2008

(51) Int. Cl.

*B01L 11/00* (2006.01)
*B01L 3/02* (2006.01)
*G01N 1/10* (2006.01)
*B01D 57/02* (2006.01)

(52) U.S. Cl. ........................ 422/101; 422/100; 422/103; 204/451; 436/180

(58) Field of Classification Search .................. 422/100
See application file for complete search history.

(56) References Cited

OTHER PUBLICATIONS

High-sensitivity miniaturized immunoassays for tumor necrosis factor using microfluidic systems, Sandro Cesaro-Tadic, Gregor Dernick, David Juncker, Gerrit Buurman, Harald Kropshofer, Bruno Michel, Christof Fattinger, Emmanuel Delamarche, Lab Chip, 2004, (6),563-569.*

* cited by examiner

*Primary Examiner*—Jill Warden
*Assistant Examiner*—Dean Kwak
(74) *Attorney, Agent, or Firm*—Michael J. Buchenhorner; Stephen C. Kaufman

(57) ABSTRACT

A capillary system for performing surface assays comprising a capillary pump containing at least two zones having different capillary pressures for obtaining controlled flow rate of liquids. The different pressure zones may be created by various means such as by creating posts in the walls of the capillary pump, by having different sized capillary of the different zones, by changing the wetting properties, by defining friction at the walls of the pump or by combinations of any of the above. The capillary system finds use in various surface assays and can be programmed for defining the volume and rate of liquid flowing through the test sites. A microfluidic chip containing assembly of programmed capillary systems for performing need based specific assays and modifications thereof.

37 Claims, 14 Drawing Sheets

CAPILLARY SYSTEM FOR CONTROLLING THE FLOW RATE OF FLUIDS

FIELD OF THE INVENTION

The present invention relates to the field of microfluidic technology and provides for a capillary system wherein the flow rate of fluids is controlled by using capillary pressures. The capillary system finds its application in various analyses at microscopic level wherein small amounts of reagents, samples and analytes are used and can be applied to an automatic microanalysis system such as biosensors, biochips and high throughput screening.

BACKGROUND OF INVENTION

Microanalysis for detection of analyte molecules is routinely employed in various analytical, bio-analytical and clinical applications. It is desirable that such assays have high specificity, use small volumes of reagents and samples, are performed as rapidly as possible and have high-sensitivity.

Assays are optimized to comprise a specific number of steps of standardized duration, along with various reagents, rinsing liquids, and other solutions of well-defined volumes. Once an assay is optimized, it can be routinely performed using standard conditions. An optimized assay may be sold as a kit, which means that a user runs the assay using a well-defined protocol and is ensured of having results within the specifications of the assays. Alternatively, an optimized assay may be integrated to a clinical analyzer or to other automated instrumentation.

An important limitation with assay technologies is that they address very different applications and different users. Ideally, assays should have maximum flexibility with respect to the number of steps and volumes of sample and reagent. Ideal assays have a large number of independent tests zones for calibrations and reproducibility purposes, and the best possible sensitivity. The technology around the assay such as the signal reader, pipetting system and other peripherals in general, are preferred to be versatile, inexpensive and compact. In contrast, the assays for diagnostic applications should be as simple to use as possible.

Surface assays, which involve the accrual of analytes on a surface, are widely used because they are convenient and sensitive. The analyte from a sample is singled out and accumulated on the surface with the help of a receptor specific for the analyte allowing washing off the remaining sample and interfering molecules. A classic example of surface assays would be an immunoassay wherein following steps are involved:

- a "capture" antibody is placed on a surface
- the surface is exposed to the sample and the capture antibody binds to its specific analyte
- the surface is rinsed to remove the sample and interfering molecules
- a second antibody conjugated to a reporter molecule (dye, fluorophore, radioactive isotope, enzyme . . . ) is provided and binds to the captured analytes
- the excess of detection antibody is removed with a washing step
- the signal associated to the detection antibody is measured. This signal is related to the concentration of analyte in the sample.

The assays thus consist of multiple steps where samples, rinsing fluids, and reagents are successively employed. Microfluidic surface assays either are set for too specific applications, or require some peripheral equipment.

The receptors on surfaces and analytes in solution can be of various chemical or biological nature, such as cells, cell surface receptors, peptides, pathogens, chemicals, pesticides, pollutants, metals, metallic complexes, proteins, enzymes, antibodies, and antigens. To be utilized in an assay, a receptor and an analyte need to have a specific binding interaction. Cells immobilized on surfaces can for example be used to screen for specific analytes in solution. Conversely, ligands immobilized on surfaces can be used to screen for specific types of cells present in a solution. The receptors and analytes are sometimes called receptors and ligands. Existing devices and methods for performing microfluidic surface assays either are set for too specific applications, or require some peripheral equipment.

The known technology without using peripheral equipment for surface assay is based on the principle of lateral flow. In a lateral flow assay, a sample is added at the extremity of a device and capillary forces move the sample across zones where reagents have been placed and reach a zone with test sites. FIG. 1 depicts such a device where a capillary pump (10) is connected to the flow channel (30) and the test site (20) is located on the flow channel (30) where the assay reaction takes place. The rate of flow of the fluid in the flow channel (30) is defined by the capillary pressure. The technology based on lateral flow assay has been developed for specific applications where only one aliquot of sample (blood sample) is added to the device. This technology is not flexible and is not suited for typical assays in biology where multiple solutions and reagents must be employed for the assay.

U.S. Pat. No. 6,271,040 B1 uses the lateral flow approach for point-of-care testing applications. In U.S. Pat. No. 6,271,040 B1, the flow of the fluid is delayed by forming a hydrophobic three-dimensional pressure barrier at a region where the fluid should delay flowing. It can be used only when reagents are predisposed on the flow path of the sample. The device is sealed and the flow characteristics are determined for only one type of diagnostic application. Moreover, the pressure barrier should be formed in three-dimensional and hydrophobic surface modification, the fabrication process of which is complicated.

Another approach as depicted by FIG. 2 is the use of membrane to provide the capillary pressure needed to move liquids. The membrane also serves as a substrate for the assay. This approach is commonly used for point-of-care testing such as for pregnancy testing. The hydrodynamic flow properties of membranes are limited and difficult to optimize making each application cumbersome to develop. The membranes have to be synthesized to have appropriate porosity and hydrophilicity, must be able to incorporate reagents, and must not promote the non specific deposition of analytes of reagents in unwanted locations, for example as disclosed in U.S. Pat. No. 6,455,001. The degree of miniaturization that can be achieved using microfabrication techniques is not accessible to technologies based on membranes. In case cells are to be analyzed it would be difficult to analyze or detect cells using membranes because membranes hinder the motion of cells and particles and behave like filters.

U.S. Pat. No. 6,901,963 discloses a microfluidic device utilizing a capillary phenomenon comprising a flow channel for flowing fluid, the flow channel being formed between a top substrate and a bottom substrate; a flow blocking surface for stopping a flow of the fluid in the flow channel temporarily; and a hump for delaying the flow formed in the line of continuity with the flow blocking surface. This device utilizes capillary pressure to flow the fluid or applies additional pressure from the outside to the fluid. The flow of fluid is delayed by a capillary pressure barrier, which is generated by an aspect ratio of the flow channel at the flow blocking surface and a flow delay angle between the flow blocking surface and the hump for delaying the flow. The delay time of the flow is adjusted delicately by adjusting the length of the hump. The flow channel is formed with the top and bottom substrates formed of hydrophilic materials, hydrophobic materials, and/or a combination thereof. This device requires precise configuration, particularly on selecting and coating the flow channel substrates.

Technologies that are more versatile however need peripheral equipment such as the microfluidic devices using electrokinetic flow principles, which need high voltage power supplies or pumps. Microfluidic technologies using acceleration forces to move liquids inside microconduits are emerging but they require a spinning platform and controlling circuits.

Elastomers have been proposed to be used as a pump to provide external pressure to allow the flow of the liquids. The elastomer has to be degassed and its refilling by air creates a pressure that can be used to draw liquids inside a microchannel. This approach is limited by the possibility of having leaks that could supply air to the elastomer and does not seem applicable for varying the flow conditions of a liquid in microstructures.

Capillary systems have recently been used with chip receivers to detect analytes with picomolar sensitivity and sub-microliter volumes of sample (Cesaro-Tadic et. al. 2004 Lab-on-a-chip, 2004, in press). To reach such sensitivity and miniaturization, the assays need extensive optimization and careful control of the flow rates of the various solutions. The flow rates are controlled by a heating element on surface of a chip receiver where the chip is placed. Pumps need to be actuated simultaneously using heat. In addition to needing peripheral equipment, the user needs to be an expert in setting the proper flow rates for his assay by actuating the heating element timely and accurately. Further, these devices are fabricated in Silicon [Si], which is an expensive material for fabricating chips with large capillary pumps. The precipitation of salts and proteins from solution in small capillary pumps due to evaporation is also an associated problem.

SUMMARY AND OBJECTS OF THE INVENTION

To overcome the aforementioned drawbacks and limitations, the present invention provides for microfluidic devices with controlled flow rates of fluids.

The object of the invention is to provide for a capillary system with a capillary pump having different pressure zones such that predefined flow rates of predefined volumes of fluids flow through the microfluidic device.

An aspect of the present invention is creating the different zones in the capillary pump with the help of posts provided at the surface of the pump.

Yet another aspect of the present invention is preventing trapping of air in the capillary of microfluidic device.

Yet another aspect of the present invention is keeping different aliquots of liquid separated in a microfluidic device.

Yet another object of the present invention is defining the filling front of the liquid in a microfluidic device.

Still another object of the present invention is eliminating the need of additional peripheral equipment for controlling the motion of liquid in the microfluidic device.

Still another object of the present invention is fabricating in inexpensive material programmed capillary pumps.

Accordingly, the present invention provides a capillary system for controlling the flow of fluid, comprising at least one loading site, at least one flow channel connected to said loading site, said flow channel having one or more test site/s, and at least one capillary pump controlling the flow rate of fluid in the flow channel, characterized in that said capillary pump has at least two different zones with differential capillary pressures.

The difference in the pressure is created by changing the wetting properties of the walls or by the presence of grooves or by providing texture surface such as posts in the walls of the capillary pump or by providing different volume/area to the zones or by combinations of any of the above three.

The present invention particularly provides for microfluidic devices for performing assays where liquids move in a controlled manner with the help of capillary pump having different pressure zones.

In accordance with another aspect of the invention, microfluidic devices containing assembly of capillary systems have also been disclosed.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Figure 1:
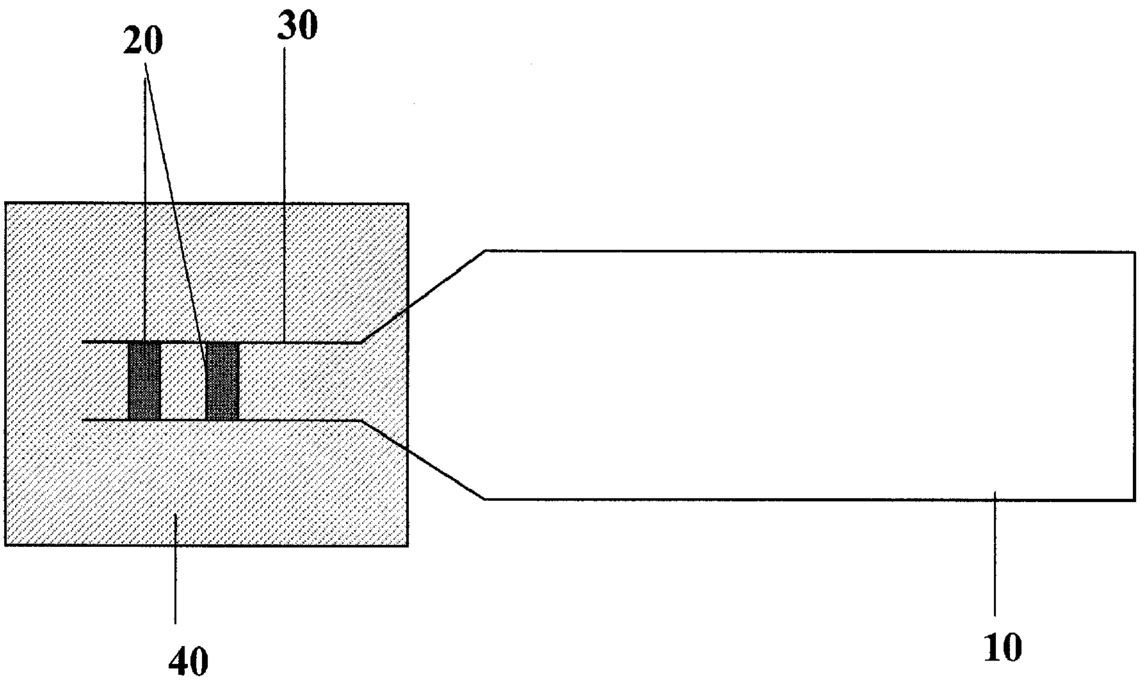
FIG. 1 shows an assay device based on lateral flow according to prior art
Figure 2:
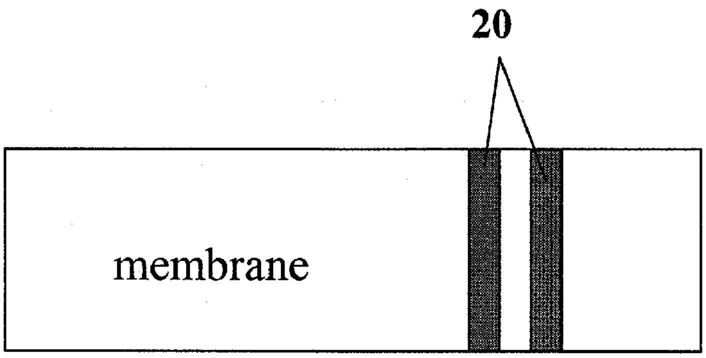
FIG. 2 shows membrane based surface assay device according to prior art.

Other objects and aspects of the invention will become apparent from the following description of the embodiments with reference to the accompanying drawings, which is set forth hereinafter. The embodiments of the present invention can be modified variously. Thus, the scope of the present invention should be construed not limited to the embodiments to be described herein. The embodiments are provided to better explain the present invention to those of ordinary skill in the art. Further, the elements and areas of the drawings are drawn roughly only, and the scope of the present invention is not limited to the relative sizes, shapes and gaps in the drawings. Same reference numerals have been provided in the figures for same element of the invention even when they appear in different figures.

The term microstructures, posts and capillary generating structures are interchangeable wherever used in the patent specification The present invention provides for microfluidic devices to perform microassays based on the technology where fluids move with the help of a capillary pump having different zones. These devices are hereinafter called capillary systems. These capillary systems may be utilized to localize assays on the surface of an elastomer. The degree of miniaturization provided by capillary systems gives many advantages such as surface immunoassays done with capillary systems only necessitate minute amounts of reagents and samples, feature high-quality signals and high-sensitivity, they can be very fast, and they are suited for the screening multiple analytes in parallel and/or in a combinatorial fashion.

Table 1 illustrates some examples of assays that can be done using capillary systems.

TABLE 1

| | Assay format | zones/steps needed | comments |
|---|---|---|---|
| 1 | fluorescence surface immunoassay | 1. capture Ab<br>2. rinse & block<br>3. sample<br>4. rinse<br>5. detection Ab<br>6. rinse | standard assay, maximum flexibility for users, can be made combinatorial |
| 2 | fluorescence surface immunoassay | 1. capture Ag<br>2. rinse & block<br>3. sample<br>4. rinse<br>5. detection Ab<br>6. rinse | e.g. assays for allergy tests |
| 3 | fluorescence surface immunoassay | 1. sample<br>2. rinse<br>3. detection Ab<br>4. rinse | capture species already deposited and blocking done before |
| 4 | fluorescence surface immunoassay | 1. sample<br>2. detection Ab<br>3. rinse | same as (3) |
| 5 | surface immunoassay | 1. sample | same as (3) and label-free detection method (e.g. SPR . . . ), possibly real-time assay |
| 6 | ELISA | 1. sample<br>2. rinse<br>3. detection Ab<br>4. rinse<br>5. substrate for enzyme | capture and blocking pre-done |
| 7 | chemiluminescence surface immunoassay | 1. sample<br>2. rinse<br>3. detection Ab<br>4. rinse<br>5. reagents | capture and blocking pre-done |
| 8 | fluorescence surface immunoassay | 1. sample | one-handling-step assay for diagnostic applications |
| 9 | cellular assays | 1. capture Ab<br>2. rinse & block<br>3. sample with cells | used to screen or identify cells in samples |
| 10 | assays on cellular receptors | 1. capture Ab<br>2. rinse & block<br>3. immobilize cells on capture Ab<br>4. sample | used to study how chemicals in sample interact with surface-immobilized cells |

Ab refers to antibody,
Ag to antigen,
SPR to surface plasmon resonance, and
ELISA to enzyme-linked immunosorbent assay.

Figure 3:
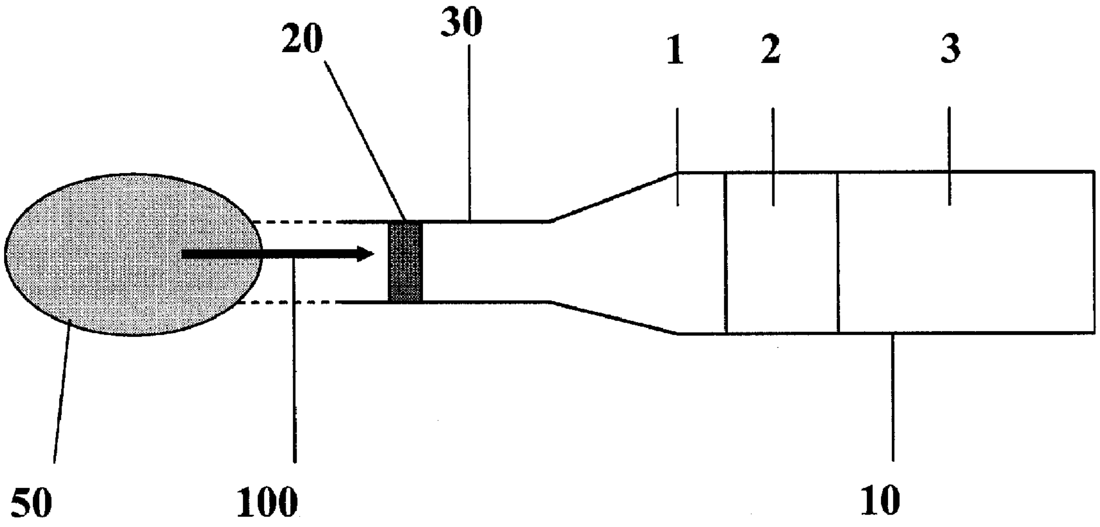
FIG. 3 shows the concept of capillary system of the present invention where the capillary pump is located after the test sites and has three zones exerting different capillary pressures.

FIG. 3 describes the concept of the capillary system of the capillary system where the flowing of liquids is based on the pressure generated by a capillary pump (10) connected to the flow channel (30). The test site (20) is shown to be located on the flow channel (30) where the assay reaction takes place. The rate of flow of the fluid in the flow channel (30) is defined by the capillary pump (10). The direction of flow (100) is from the loading/dispensing site (50) to the flow channel (30) towards the capillary pump (10). The capillary pump (10) is preferably located after the test site (20). Test site may be defined on the surface of an elastomer placed in contact with the capillary system, which may be detachable. The capillary pump (10) comprises of at least two zones (1,2) with different pressures for controlling the flow of fluid. The pump shown in the FIG. 3 has three zones (1,2,3).

Figure 4:
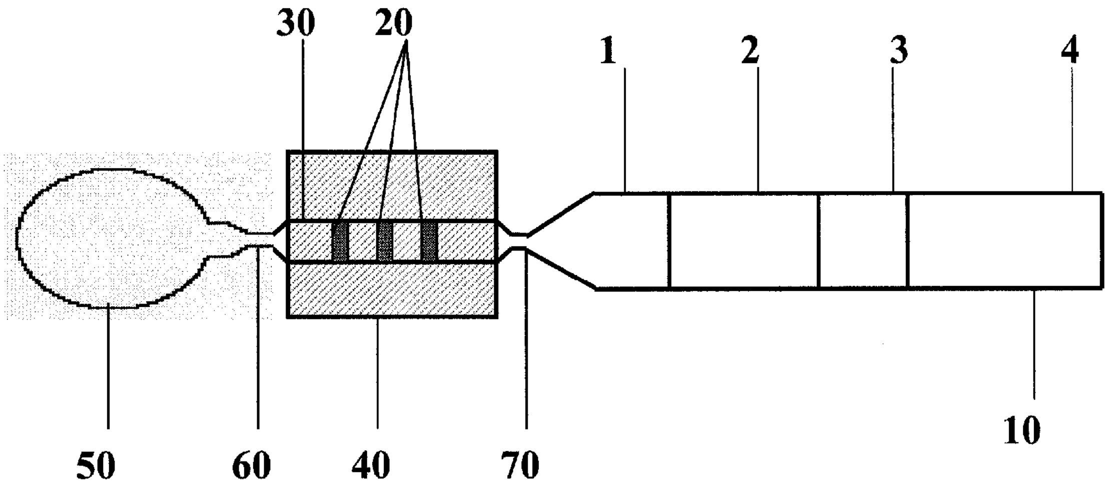
FIG. 4 shows a capillary system with multiple test sites and a capillary pump having 4 zones.

FIG. 4 depicts a capillary system in accordance with one embodiment of the invention where the capillary pump (10) has four zones (1,2,3,4) designed to exert different capillary pressures. The rate at which the liquid fills the pump is defined by the capillary pressure exerted by the each zone of the pump and the friction of liquid on the walls of capillary system. If the different parts of a capillary system are serially connected, the flow rate is equal in all parts of the device. It is therefore possible to modulate the flow rate over the test sites using the flow rate of the liquid in the pump. Multiple test sites (20) are located near the capillary pump (10). The multiple test site design of the capillary system is suited for measuring the concentration of multiple analytes in a single sample. The sample needs to be dispensed at the loading site (50) and made to move over the test-sites (20) serially containing different capture molecules for different analytes, with the help of the different pressure zones in the capillary pump (10). In another embodiment of the invention the flow channel (30) is covered with substrate (40) for the assay. The substrate (40) may be any elastomer such as Polydimethyl Siloxane (PDMS). The PDMS surface can provide the test sites (20) for the assay. These test sites (20) can be prepared using a method disclosed by Bernard et al, Anal. Chem. 2001, vol 73, pp8-12.

In another embodiment of the invention shown in FIG. 4, the capillary system have capillary retention valves (60,70) formed by reducing the cross-section at the end of the channel (30) before (60) and after (70) the test site/s (50) for retaining the liquid in the desired region before moving forward.

Figure 5:
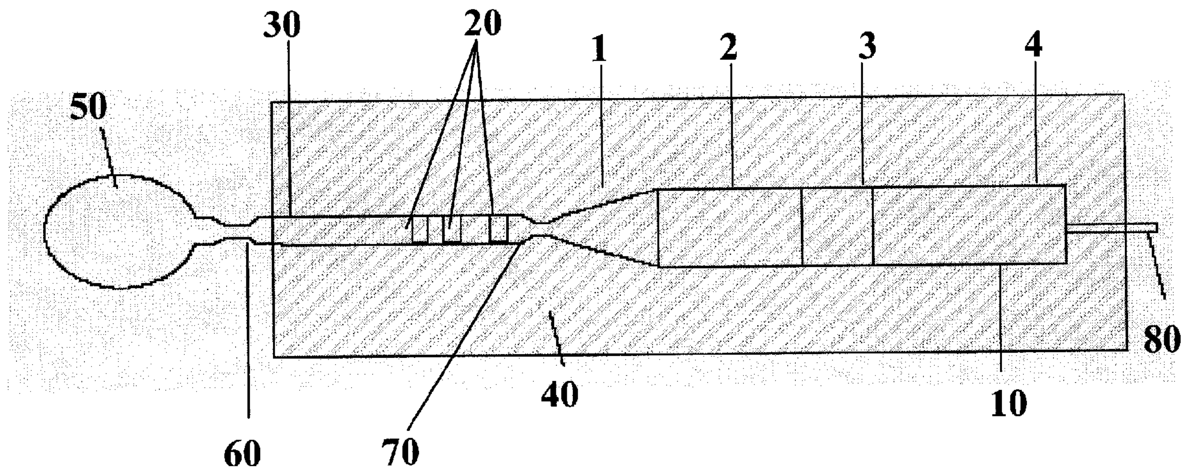
FIG. 5 shows a capillary system covered with a substrate for the assay.

In a further embodiment to the capillary system as shown in FIG. 4, the substrate (40) may almost entirely cover the capillary system. Such a capillary system is shown in FIG. 5. As seen in FIG. 5, a venting port (80) at the end of the capillary pump (10) may be provided which permits air to escape during filling of the pump (10). The loading site (50) is left accessible for pipetting aliquots into the capillary systems.

Figure 6:
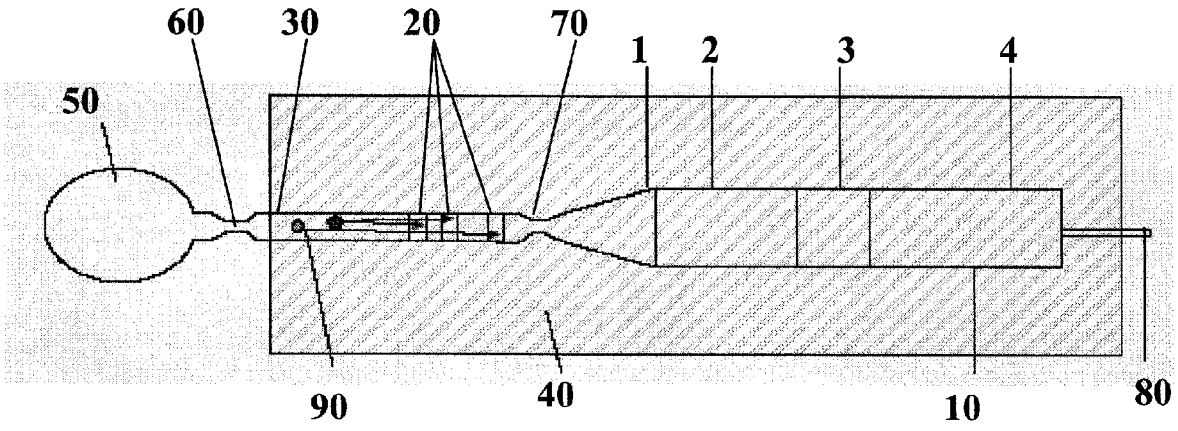
FIG. 6 shows a capillary system having reagents disposed on the flow path of samples loaded into the loading pad.

FIG. 6 shows a modified capillary system covered with a substrate for the assay where reagents (90) are disposed on the flow path of samples loaded into the loading pad (50). Such reagents can be detection antibodies (DA) deposited using an inkjet robot and dried. A fraction of the volume of sample loaded in the pad redissolves the detection antibodies, which bind to analytes (AN) present in the sample. The excess of detection antibodies (DA) and the analyte-detection antibodies (AN-DA) complex flow over the test sites. The test sites are composed of surface-immobilized capture antibodies (CA). The capture antibodies (CA) bind the analyte-detection antibody (AN-DA) complexes. An excess volume of sample flushes away the excess of detection antibodies (DA) to the capillary pump. This assay necessitates only one pipetting step and is therefore particularly suited for diagnostic applications. The capillary system with different zones in the pump is particularly useful to optimize the durations of the steps corresponding to the dissolution of detection antibodies (DA), their binding to analytes (AN), and the capture of the analyte-detection antibody (AN-DA) complex, while minimizing the total time needed for the assay.

The volume of the capillary pump must be large enough to accommodate all solutions added to loading pads. For example, if an assay has 4 steps comprising the addition of 600 nL of sample, 1200 nL of rinsing solution, 600 nL of detection antibody solution, and 1200 nL of rinsing solution, the capillary pump should be able to accommodate the total volume. The programmed capillary pump of the present invention fulfills the requirement very efficiently.

Figure 7:
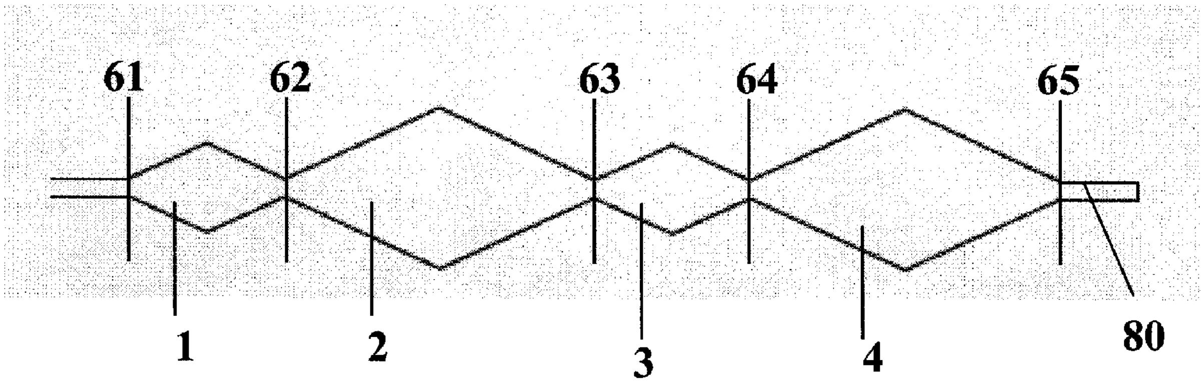
FIG. 7 shows a capillary pump for a four step surface immunoassay with different volume zones.

FIG. 7 shows a capillary pump (10) configured for a surface immunoassay. The first zone (1) is used to define a long incubation time corresponding to the capture of analytes to capture antibodies located on the test sites. Second zone (2) is used to rinse quickly the test sites with a relatively large amount of solution. Third zone (3) is used to bind detection antibodies to the captured analytes. This step can be done significantly faster than the capture step because detection antibodies are at a typically higher concentration than analytes and therefore have a faster binding kinetics. A fourth zone (4) is used for the final rinse before measuring the signal on the test sites and carried by detection antibodies. The slight constriction (61, 62, 63) between each zone reduces the number of paths from one zone to the next one, thereby reducing the chance of having undefined filling fronts. It also helps to separate the zones visually, which facilitates the retrieval of samples or solutions contained in any zone of the pump.

Figure 8:
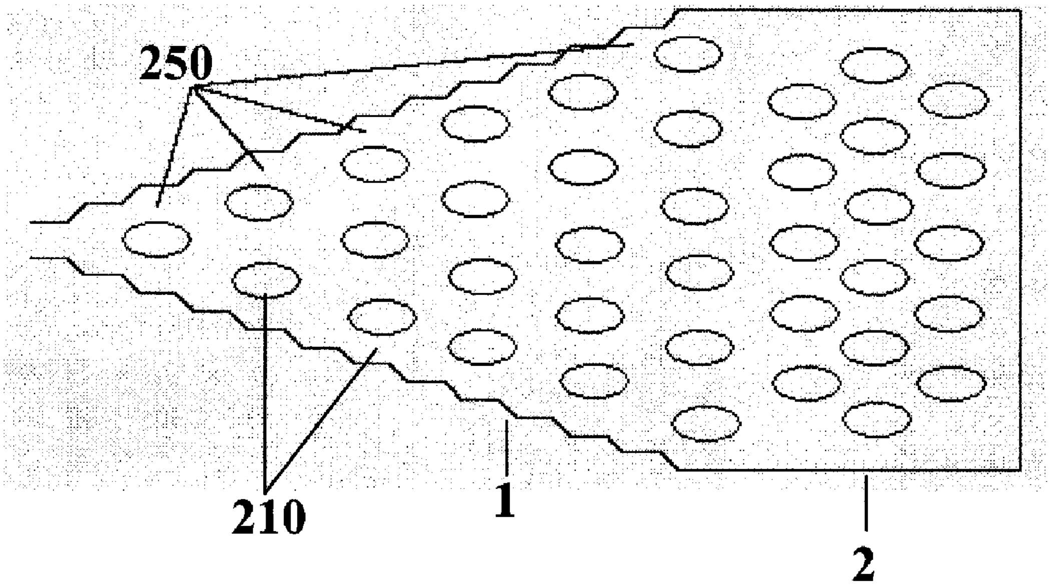
FIG. 8 shows the inside view of a capillary pump having two zones and oval posts.

One of the preferred embodiments of the invention is to control the differential capillary pressures in the different zones with the help of defined surfaces such as grooved or textured surfaces hereinafter referred to as posts (200). These posts may be of different shapes such as hexagonal, diamond shaped, oval or rounded etc. The posts may be elongated to have their main axis aligned in the same direction. Such elongated posts may also be ellipses or lines or curved lines FIG. 8 shows cross section of a part of a capillary pump (10) with two zones having hexagonal posts (210). Depending on the symmetry of the capillary generating structure and their lattice, exact calculation of the capillary pressure might be possible. It is an assumption that all surfaces in the capillary pump have the same wetting properties in general although these wetting properties may be tailored in the different parts of the pump. Changing the wetting properties of the capillary pump in different parts help in varying flow rates without affecting flow resistances.

In FIG. 8 the oval shaped posts (210) exert a capillary pressure inside the pump (10) and the spacing between the posts (250) determines the magnitude of the capillary pressure. The filling factors of the first (1) and second zones (2) are ~25% and ~50%, respectively. In this embodiment the second zone (2) is twice as large as the first zone (1) in order to contain the same volume of liquid than zone 1. The flow resistance of zone 2 is larger than that of zone 1, and the flow resistance of both zones defines the filling rate of zone 2. For this reason, capillary pressures in zones must account for the cumulated flow resistance of all structures placed before.

Figure 9:
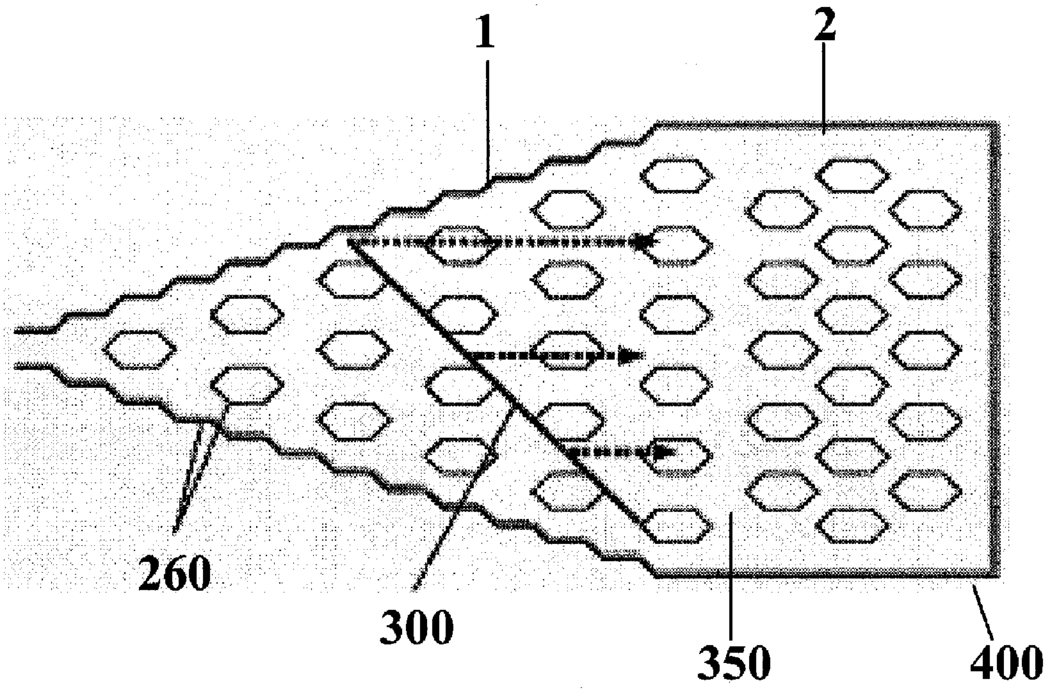
FIG. 9 represents the filling front of liquid inside capillary pump having two zones and hexagonal posts.

FIG. 9 represents the filling front (300) of liquid for capillary features in the pump (10) having distorted hexagonal posts. Such a capillary may have a length of 100 μm, a width of 60 μm, and a length for the parallel sides of 40 μm. The filling front (300) remains well defined during filling and keeping a sufficient lateral distance between the walls of the pump and the walls of the posts (260) is important to prevent uncontrolled filling of the pump as the outer walls of the pump provide a low flow resistance path for the filling liquids. Typically an incoming liquid quickly wets the walls and forms thin film of liquid in the corner of the walls of the pump (400). It is important that the capillary generating structures are not too close from the walls otherwise liquid wetting the walls of the pump might touch the microstructures in the pump. This would create a non-controlled filling front of liquid and could result in entrapping air in the pump. The drop of capillary pressure (350) between zone 1 and 2 prevents the entering of liquid in zone 2 before the previous zone is filled.

Figure 10:
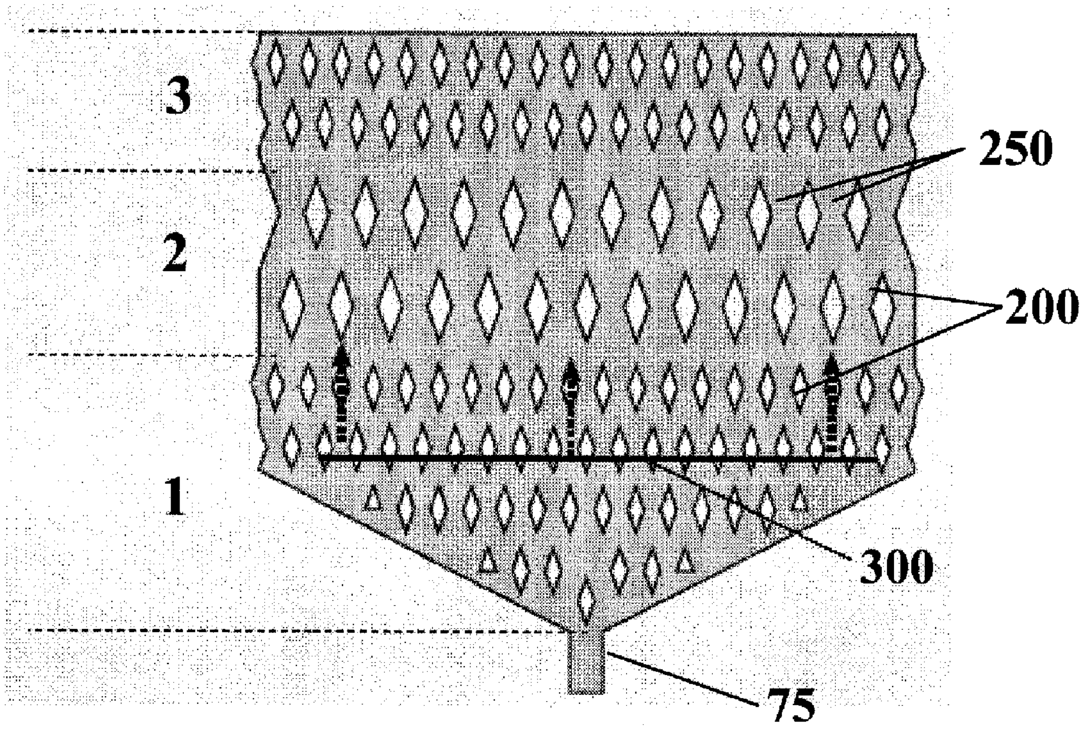
FIG. 10 shows a capillary pump having diamond shaped posts in three zones.

FIG. 10 shows the cross section of a capillary pump (10) having three zones (1,2,3) in accordance with another preferred embodiment of the invention. In this pump the coupling between the end of the channel (75) and the beginning of the pump (10) is carefully designed. This region (75) is very critical for drawing the liquid forward. Elsewhere in the pump, even if the liquid is pinned or slowed by a drop in capillary pressure due to some defect, multiple paths can still draw the liquid further. An important challenge with such a pump is to create a straight filling front on a very wide area, so that the next zone starts filling only when the previous one is entirely filled, that is without trapping of air. This feature of the embodiment is achieved by an asymmetric geometry and distribution of the posts (200). Because the gap between the posts (250) is larger along the vertical axis than along the horizontal axis, the liquid will preferentially spread along the horizontal axis, and thus define a straight filling front. This in turn will guarantee that the liquid entirely fills zone 2, which exhibits a low capillary pressure, before it starts filling the zone 3 with a high capillary pressure. The compromise for this design is that the pressure is cyclically dropping each time the liquid jumps from one row to the next one. On the other hand, an advantage of this pump (10) is that due to the wide cross-section of the channel, the flow resistance of the pump (10) is so small that it does not interfere with the functionality.

Figure 11:
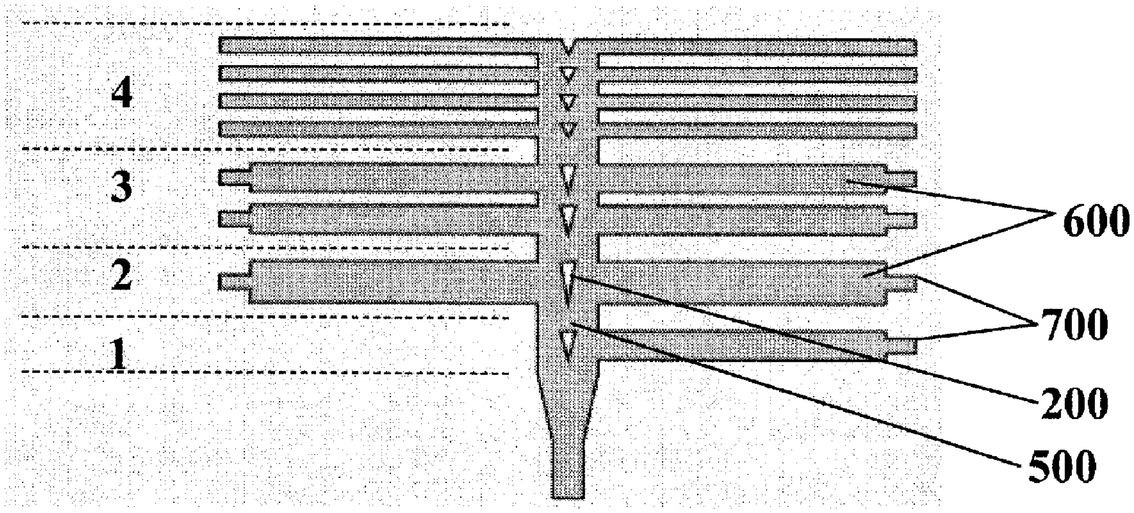
FIG. 11 shows a capillary pump with four different zones each having side-channels.

FIG. 11 shows a capillary pump (10) with four different zones (1,2,3,4) each exhibiting a differential capillary pressure. The different zones are distributed along a central delivery channel (500) with a large dimension therefore having low capillary pressure. This ensures that the side-channels (600) get filled preferentially, and also prevents the liquid of reaching a zone before the previous one is entirely filled. The posts (200) in the middle of the delivery channel (500) serve the purpose of guiding the liquid into the side-channel (600). If the posts (200) are not present, the side-channels (600) will form a valve that might bring the liquid to rest and compromise the filling of the pump (10). For the evacuation of the air, the side channels (600) need to be open-ended (700). The geometry of the side-channel end (600) needs to be specially designed for preventing the liquid from spilling. To retain the liquid from being drained, the cross-section may be reduced at the end of the side-channel (600) such as to form a capillary retention valve (750) and retain the liquid within the side-channel (600).

Figure 12:
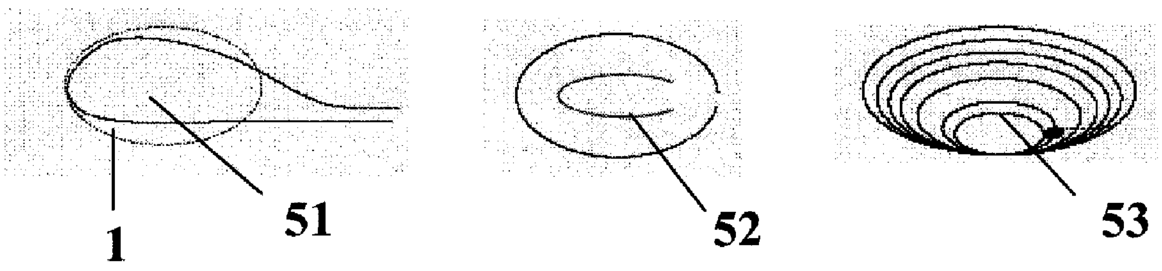
FIG. 12 shows loading pads having geometries optimized for displacing the entire volume of liquid in the pad.

It is noteworthy that a capillary pump (10) fills only if it exerts higher capillary pressure than that at the loading site (50). A typical area for a loading pad (50) may be 1 $mm^2$ or more. The structures (200) generating capillary pressure in the pump (10) should therefore be large in order to prevent having a large flow resistance when large flow rates are desired. FIG. 12 shows different embodiments of the loading site (50) to be used as loading pads (51, 52, 53) having geometries optimized for displacing the entire volume of liquid to a capillary pump (10). In a simple loading pad shown as dotted lines (59) a small volume of liquid tend to be pinned in the center of the loading pad (51). This may lead to contamination effects or non-accurate dosing of liquids. It is particularly important that the capillary pump (10) draws the liquid initially placed in the loading pad (50) through the various elements of the capillary system. Making the pad non-symmetric (51), three-dimensionally shaped (52), or having dewetting tracks (53) helps the liquid to leave entirely the loading pad.

Loading pads can also comprise of capillary tube, a needle or a lancet, which may be used to withdraw an aliquot from a liquid sample. For example, a needle can be used to directly obtain a small volume of blood from the fingertip of a patient. Such additional feature of the loading pad would require the use of capillary pumps with sufficient capillary pressure.

Figure 13:
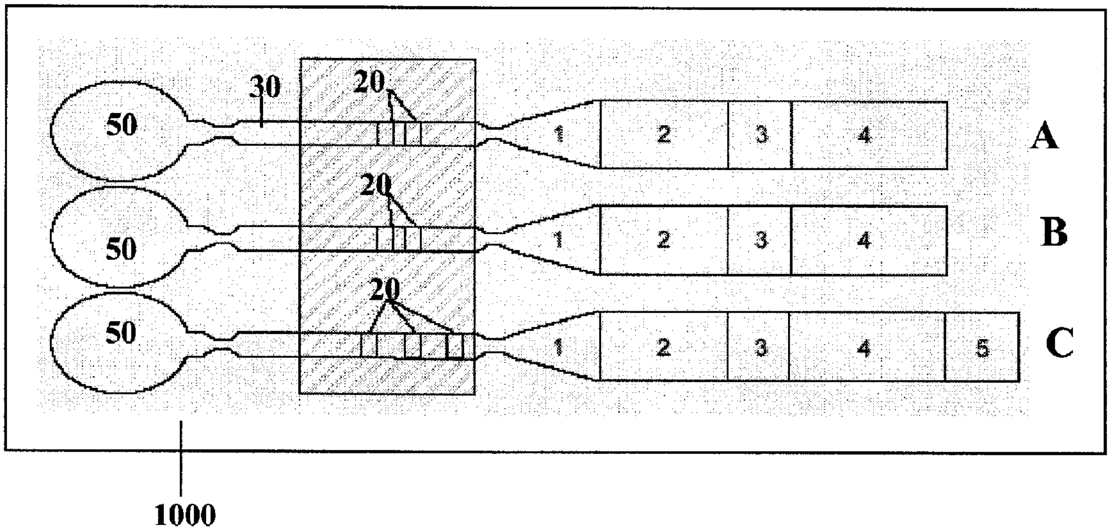
FIGS. 13 & 14: shows assembly of capillary systems having capillary pumps to form microfluidic chip.

In one of the preferred embodiments, the capillary systems of the invention may be assembled to form a configured microfluidic chip. FIG. 13 shows one possible assembly configurations. FIG. 13 shows an assembly of three independent capillary systems (A, B, C) having for analysis of different samples in parallel to form a microfluidic device (1000) in form of a chip. Two of the capillary systems (A and B) have identical capillary pumps with four zones. The third capillary system (C) has five zones in the capillary pump (10).

The microfluidic chip (1000) of FIG. 13 based on the capillary system may have been configured to have three systems for analyzing a single sample in three different assays. System A and B have the same type of capillary pump and can be used to improve the intra assay accuracy. System C has one more zone in the capillary pump than systems A and B. This extra zone means that when 4 aliquots are dispensed in systems A and B, more aliquots can still be filled in system C. The flow rates in system A, B and C can also be varied. This is particularly useful when the preferred incubation times for an assay are unknown. This is also useful to vary the state of advancement of the assay and widen the dynamic range of the assay. The flow rate of a sample can be increased or decreased in selected channels to modulate the incubation time and receive better signals.

Figure 14:
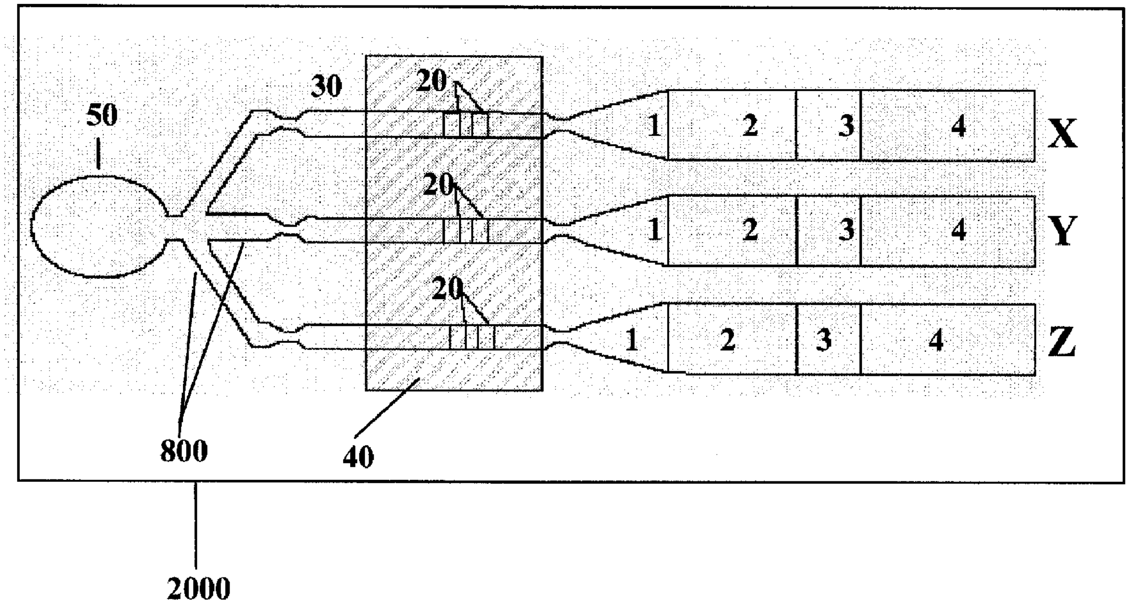

One of the preferred embodiments of the invention provides for a microfluidic device with an assembly of capillary system where having at least one of parts of the capillary system is common for all the systems. FIG. 14 depicts such a microfluidic device (2000) with an assembly of three capillary systems (X, Y, Z) where a single loading pad (50) is connected (800) to the three flow-channels (30). All the three systems (X, Y and Z) have been shown to have identical capillary pumps with four zones, though various modifications are possible.

This device (2000) may be useful when series of diluted samples need to be analyzed in parallel. The device (2000) may also be used for analyzing samples redundantly, or for analysis of calibration samples.

The first time a liquid flows through the capillary system, the flow-rate of the volume required to fill the test-site (20) is not controlled by the capillary pump (10). This liquid volume is however negligible. The distance between the sample dispensing site and the pump typically comprises of a volume of ~12 nL. A typical volume of a capillary pump and of the sample placed in loading pad is 100 nL and 300 nL respectively. For high-sensitivity assays 600 nL of sample is typically used and test sites are located close to the capillary pump. Therefore the fraction of the first solution that fills the capillary system without having a flow rate controlled by the capillary pump is negligible.

In accordance with the invention, a capillary system with a capillary pump having a volume of ~3.6 microliters, i.e. 100 $mm^2$ in area for a depth of 35 micrometers may be ideal for a four step assay as described above. Since the microfabrication of 2D structures is much simpler than the microfabrication of 3D structures, 2D (same depth for all elements) capillary systems with a depth of ~35 micrometers may be employed. Programming flow rates using capillary pumps gives the possibility to have very small flow rates (10 nL/min and less). This makes possible the reduction of the volumes of solutions used for an assay. In elements of micrometer dimension, the flow of solution is typically laminar, i.e. solutions do not actively mix. Some rinsing steps can therefore be omitted. Using a programmed capillary system, the exemplified assay can be done using 100 nL of sample, 100 nL of solution with detection antibody, and 200 nL of rinse solution. A 35-micrometer-deep capillary pump would need to be only 11 $mm^2$, and a 105-micrometer-deep capillary pump would need an area of only 3.7 $mm^2$. The area of the capillary pump of a capillary system can be as less as ~2.4 $mm^2$. Table 2 summarizes the area of a programmed capillary pump for different assay conditions and depth of the capillary system.

TABLE 2

| Assay | Liquid volume | Depth of capillary system | Minimum area of pump |
|---|---|---|---|
| variant 1 | 600 nL sample<br>1200 nL rinse<br>600 nL detection antibody<br>1200 nL rinse | 35 μm | 102 $mm^2$ |
| variant 2 | Same as variant 1 | 105 μm | 34 $mm^2$ |
| variant 3 | 100 nL sample<br>100 nL detection antibody<br>200 nL rinse | 35 μm | 11 $mm^2$ |
| variant 4 | Same as variant 3 | 105 μm | 3.7 $mm^2$ |

Figure 15:
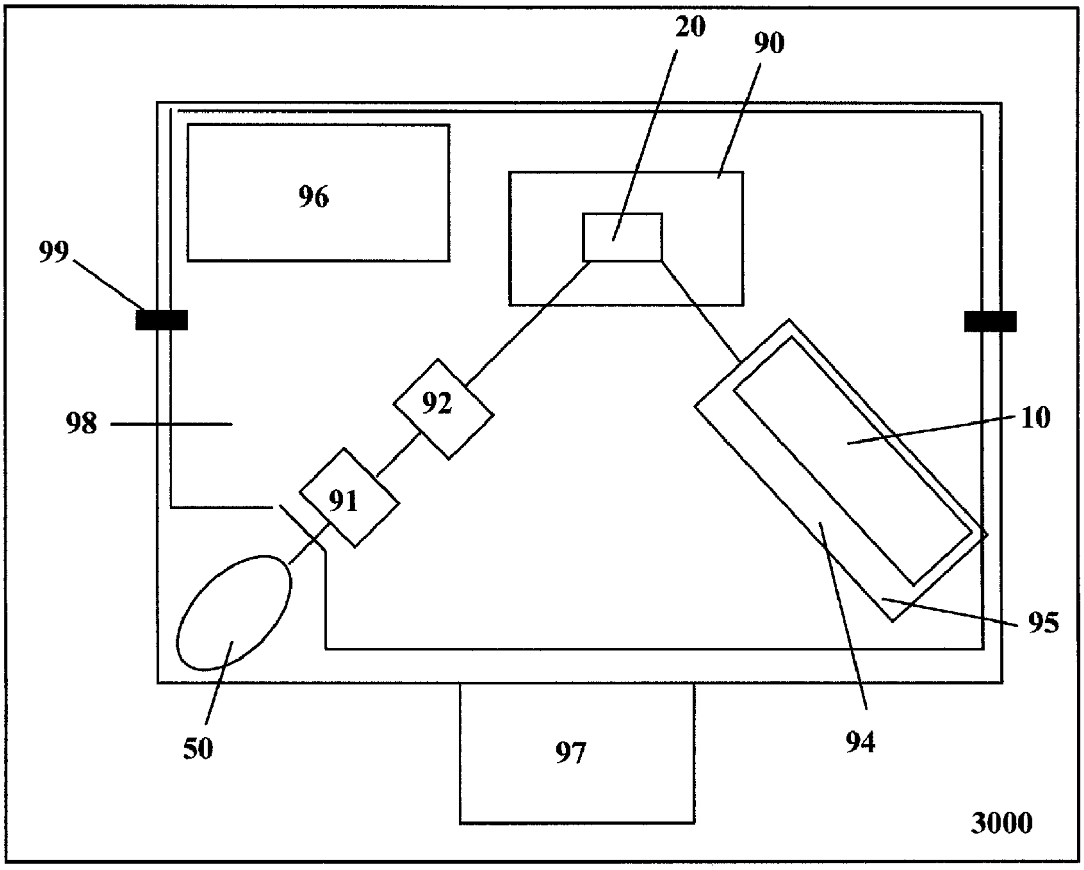
FIG. 15 shows a capillary system for efficiently handling the capillary system, and reading signals.

Various modifications of the capillary system are possible for making the device more efficient and user friendly. The analysis of samples sometimes necessitates safety precautions to prevent instruments to be contaminated by samples or reagents. Also the prevention of users from being exposed to hazardous substances is essential in certain assays. A capillary system can be optimized for limiting the risk of contamination/exposure. The geometry of a capillary system may also be optimized for easing the reading of signals from test sites. FIG. 15 shows a preferred embodiment wherein a capillary system is designed to reduce the risk of contamination, to ease the handling of the capillary system, and to simplify the reading of the results obtained with a capillary system.

In FIG. 15, the capillary system (3000) has a loading pad (50) and a capillary pump (10) opposite to the test sites (20). If a sample spills out of the loading pad (50) or has a volume that exceeds the volume of the capillary pump (10), it is unlikely for such a capillary system (3000) that excess liquid or spilled liquid covers the region where the test sites (50) are located. Similarly, if signals located on the test sites (50) shall be read by an instrument, the risk of contaminating an instrument with samples or reagents is minimized by placing the test sites (50) opposite to the loading pad (50) and capillary pump (10).

The capillary system (3000) may have a handling part nearby the loading pad (50) or capillary pump (10) and a convenient way to use such a capillary system (3000) is for a user to (i) load a sample in the loading pad (50), (ii) wait until the sample has flown through the device to the capillary pump (10) to effect the reaction on the test sites test (20), (iii) and to visualize the result of the test by eye by looking at the test sites (20) or to insert the capillary system (3000) into a signal reading instrument. The capillary system (3000) may have parts to facilitate insertion into a signal reading instrument. Such parts can, for example, be stoppers (99) to ensure that the capillary device is inserted in an instrument in an optimal manner for reading a signal from the test sites (10). If the area where the test sites (10) are located is large, it might be difficult to read all signals simultaneously. In this case a sliding mechanism from the signal reading instrument can be used to move the capillary system (3000) and read signals sequentially. A particularly convenient signal format for assays is an optical signal such as, for example, fluorescence. Therefore, the cover sealing the capillary system may have one or several optical windows (90,95) to enable viewing or reading optical signals on the test sites. If fluorescence signals are read from the test sites (20), it is preferable to have a thin optical window (90) over the test sites so that a microscope objective having a small working distance can be used. Another optical window (95) can be placed over the capillary pump (10) to monitor the status of filling of the capillary pump (10). In the case of analyzing samples containing particles or cells, a filtration of the sample might be desirable to prevent clogging of the capillary pump (10) or of other parts of the capillary system. If cells or particles in a sample are to be analyzed by detection on the test sites (20), such a filtration is not needed. Filtration can be done by adding a filtration unit (91) to the capillary system after the loading pad (50). If reagents such as detection antibodies are needed for an assay, they also can be placed in a region (92) located after the loading pad (50). Having text or numbers displayed on some regions (94,96) of a capillary system (3000) may facilitate the use of a capillary system (3000) by non-experts. For example, volumes can be indicated at different locations (94) around the capillary pump (10) to indicate the state of advancement of a test. Some text indicating some or all of the specifications (96) of a capillary system (3000) can be added to assist users.

A variety of assays can be done using a capillary system similar to the one shown in FIG. 15. Some surface assays employ enzymes on test sites to report the presence of analytes captured on a surface via the catalytic transformation of a non colored chemical into a strongly colored product. Such assays may be performed using capillary systems having a capillary pump with at least one very slow filling zone. This slow filling zone can be utilized to slowly supply chemicals to enzymes located on the test areas while giving enough time for the concentration of enzymatic products. A similar assay can be done using an electrical signal. In this case, the enzymes may catalyze an oxydo-reduction reaction leading to an electrical or luminescent signal. Electrodes placed in the region of the test sites can be used to record one or several electrical signals originating from one or several test areas. Similarly to reading fluorescence signals on the test sites, electrical or optical signals can be measured using a reading instrument.

Capillary systems as described in FIG. 15 may also be assembled to form a configured microfluidic chip similarly to the microfluidic chips described in FIGS. 13 and 14.

Figure 16:
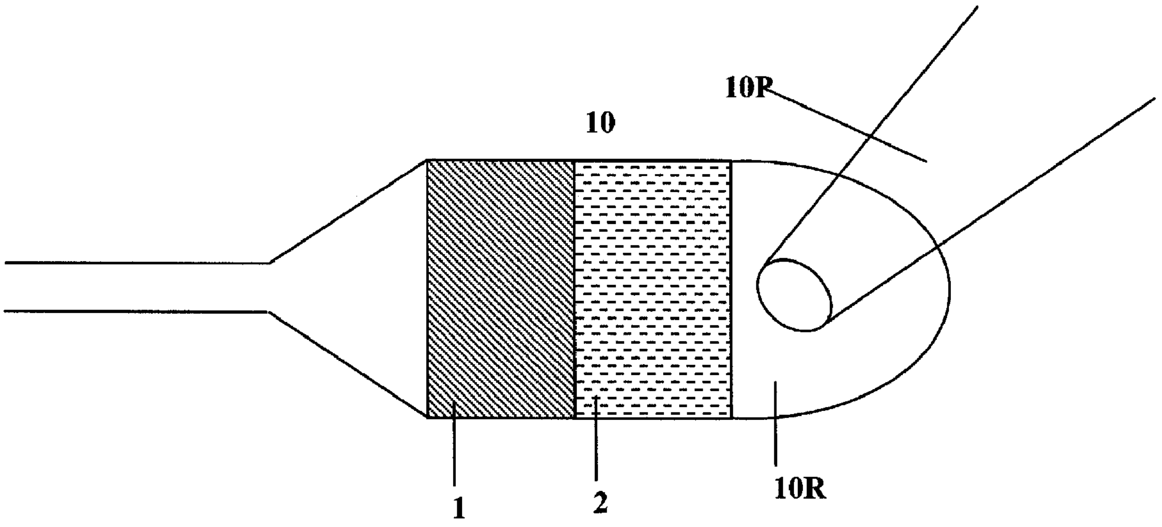
FIG. 16 shows a capillary pump having a zone from which liquid can be retrieved using a pipette.

Using additional methods may complement the analysis of samples using capillary systems or microfluidic chips. For example, it may be needed to retrieve some of the sample located in a capillary pump. In one of the preferred embodiments of the invention, capillary systems or microfluidic chips have a capillary pump from which a sample can be retrieved. A capillary pump for retrieving the fraction of a sample that has been loaded on a capillary system is displayed in FIG. 16. The capillary pump (10) of FIG. 16 has three zones (1,2,10R) and the last zone (10R) has the facility of sample retrieval. A pipette tip (10P) has been shown to be inserted in the last zone (10R) for allowing the sample from the capillary pump (10).

All the zones of a pump from which liquid could be retrieved must generate a stronger capillary pressure than the loading pad located at the beginning of the capillary system to ensure proper filling of the pump. One zone in the capillary pump, however, can have a reduced number of microstructures and a sufficient area to allow a pipette or micropipette to be placed in the pump without damaging the capillary pump. The pipette can be used to aspirate liquid out of the pump. The aspirated liquid can be analyzed for example to perform additional tests, to calibrate or serve as a reference for a capillary system or microfluidic chip, or even to store a liquid sample that has passed through a capillary system for archiving purposes. Since capillary systems and microfluidic chips as described in the invention are based on displacing liquids using capillary forces and because capillary forces depend on the wettability of surfaces, it may be important to fabricate capillary systems or microfluidic chips under conditions that prevent the contamination of wettable surfaces. Wettable surfaces are prone to airborne contamination and tend to become more hydrophobic subsequently to contamination. When wettable surfaces are exposed to inert gases such argon or nitrogen, they remain hydrophilic for a longer time due to the absence of contaminants. In one of the preferred embodiments of the invention, the capillary systems or microfluidic chips are packaged under an inert gas such as argon or nitrogen to keep them clean and wettable for extended periods of time. Reagents such as biomolecules, antibodies or enzymes can have limited lifetime when they are in a dry state. In another preferred embodiment of the invention, the lifetime of reagents in the capillary systems or microfluidic chip is improved by packaging the capillary systems or microfluidic chips under a gas that contains a controlled amount of moisture. Such capillary systems or microfluidic chips can be fabricated and stored until use in a sealed package.

Fabricating capillary systems with programmed capillary pumps in inexpensive material is ideal. It is one of the preferred embodiments of the invention that the capillary system may be fabricated in plastic using hot embossing or mold injection techniques. Plastic materials being typically hydrophobic or chemically unstable when defined for microfluidic applications, it is a further embodiment of the invention to evaporate a thin layer of Titanium, [Ti] (a few nanometers) and Gold [Au] (50 to 150 nm) on plastic and coating the Au film with alkanethiols having appropriate functional groups to make the non filling areas of the capillary system hydrophobic and the filling areas hydrophilic in the capillary system. Alternatively, the hydrophobic plastic can be oxidized using a UV/ozone treatment. After oxidation, plastics typically become hydrophilic and can also be further functionalized by attaching polar molecules.

Besides fabricating the capillary system completely in an inexpensive material, the parts of a capillary system, which necessitate small areas may be fabricated in a more expensive material. Since capillary pumps typically need a larger area than capillary retention valves, microchannels or test sites, it is one of the preferred embodiments of this invention that the capillary pump be fabricated in an inexpensive material such as a plastic piece, which may be affixed to other elements made in a more expensive material such as micro-fabricated silicon to form a composite capillary system. Cost effective capillary systems can thus be assembled.

While the present invention has been described with respect to certain preferred embodiments, it will be apparent to those skilled in the art that various changes and modifications may be made without departing from the scope of the invention as defined in the following claims.

What is claimed is:

1. A capillary system for controlling a flow of fluid, said capillary system comprising:

at least one loading site, at least one flow channel having at least one test site, and at least one capillary pump controlling a flow rate of fluid in the flow channel, characterized in that said capillary pump comprises:

open-ended side channels;

at least two different zones with different capillary pressures;

wherein the at least two different zones of the capillary pump are distributed along a central delivery channel with a large dimension providing low capillary pressure such that the side channels are filled preferentially, wherein said central delivery channel comprises posts in a middle of the central delivery channel for guiding the fluid into the side-channels; and wherein a cross-section of the side-channel is reduced at an end of said channel such as to form a capillary retention valve and retain the fluid within the side channel.

2. The capillary system according to claim 1 wherein said difference in the pressure is created by changing the wetting properties of the surfaces or by the presence of different posts in the surfaces of the capillary pump or by providing different volume/area to the zones or by combinations of any of the above three.

3. The capillary system according to claim 2 wherein the posts in the surface of the capillary pump are of different shapes.

4. The capillary system according to claim 3 wherein the shape of the posts in the surface of the capillary pump is hexagonal or triangular or diamond or oval or circular.

5. The capillary system according to claim 3 wherein the posts in the surface of the pump are elongated so as to become ellipses or lines or curved lines.

6. The capillary system according to claim 3 wherein the posts in the surface of the pump are elongated and have their main axis aligned in the same direction.

7. The capillary system according to claim 3 wherein the shape of the posts in the surface of the capillary pump is oval or circular.

8. The capillary system according to claim 2 wherein there is a sufficient lateral distance between the walls of the pump and the walls of the posts to prevent uncontrolled filling of the pump.

9. The capillary system according to claim 1 further comprising capillary retention valves formed by reducing the cross-section at the end of the channel before and/or after the test site/s.

10. The capillary system according to claim 1 further comprising of assay reagents disposed in the flow channel.

11. The capillary system according to claim 1 wherein the test site is defined on the surface of an elastomer.

12. The capillary system according to claim 11 wherein the said elastomer is detachable from the capillary system.

13. The capillary system according to claim 11 wherein the said elastomer is PDMS.

14. The capillary system according to claim 1 further comprising substrate for analyte detection assay.

15. The capillary system according to claim 14 wherein said substrate for analyte detection assay covers the flow channel.

16. The capillary system according to claim 1 wherein said substrate for analyte detection assay covers the flow channel and the capillary system further comprises a venting port at the end of the capillary pump to allow the escape of air.

17. The capillary system according to claim 1 wherein predefined flow rates of predefined volumes of fluids are achieved using the at least one capillary pump.

18. The capillary system according to claim 17 wherein said predefined flow rates are such that a slower rate followed by a faster flow rate are sequentially defined.

19. The capillary system according to claim 1 wherein said loading site have geometry optimised for displacing the entire volume of liquid to a capillary pump.

20. The capillary system according to claim 19 wherein said loading site is either three-dimensionally shaped, or non-symmetric or has dewetting tracks, or has some of its areas or lateral walls hydrophobic.

21. The capillary system according to claim 1 wherein the capillary pump is fabricated in plastic, and a thin layer of Titanium and Gold is evaporated on the plastic, the gold film being coated with alkanethiols having appropriate functional groups such that the non filling areas of the capillary system become hydrophobic and the filling areas become hydrophilic and protein-repellent.

22. The capillary system according to claim 1 wherein the capillary system is entirely or partially fabricated in plastic and wherein said plastic is treated using ultraviolet light and ozone to make the capillary system hydrophilic.

23. The capillary system according to claim 22 wherein the treated plastic is functionalized with polar molecules.

24. The capillary system according to claim 1 wherein the test sites are on a side opposite to the loading site and capillary pump.

25. The capillary system according to claim 1 wherein the capillary system is packaged and sealed in an inert atmosphere.

26. The capillary system according to claim 25 wherein the capillary system is sealed in an atmosphere of argon or nitrogen.

27. The capillary system according to claim 1 wherein the capillary system is sealed in an atmosphere with a controlled relative humidity.

28. The capillary system according to claim 25 wherein text or numbers are displayed on the capillary system to provide information or instructions to a user.

29. The capillary system according to claim 1 wherein the capillary system has one or several optically transparent windows to monitor the flow in the device or monitor the status of filling of the capillary pump.

30. The capillary system according to claim 1 wherein the capillary system has a filtration chamber located after the loading site.

31. The capillary system according to claim 1 wherein said filtration chamber is used to filter cells.

32. The capillary system according to claim 1 wherein cells are located on the test sites.

33. The capillary system according to claim 1 wherein the sample loaded in the loading site contains cells which are analyzed using the test sites in the capillary system.

34. The capillary system according to claim 1 wherein a lancet or capillary tube or a needle is affixed to the loading site.

35. The capillary system according to claim 1 wherein electrodes are incorporated in the region of the test sites.

36. A microfluidic device comprising an assembly of two or more capillary systems controlling a flow of fluid, each capillary system comprising:

at least one loading site, at least one flow channel having at least one test site, and at least one capillary pump controlling a flow rate of fluid in the flow channel, characterized in that said capillary pump comprises:

at least two different zones with different capillary pressures;

open-ended side channels;

wherein the at least two different zones of the capillary pump are distributed along a central delivery channel with a large dimension providing low capillary pressure such that the side channels are filled preferentially, wherein said central delivery channel comprises posts in a middle of the central delivery channel for guiding the fluid into the side-channels; and wherein a cross-section of the side-channel is reduced at an end of said channel such as to form a capillary retention valve and retain the fluid within the side channel.

37. A microfluidic device comprising:

an assembly of two or more capillary systems for analysis of a sample in two or more assays, where the capillary systems control the flow of fluid and each capillary system comprises: at least one flow channel having at least one test site;

at least one capillary pump controlling a flow rate of fluid in the flow channel, characterized in that said capillary pump comprises:

at least two different zones with different capillary pressures, open-ended side channels;

wherein the at least two different zones of the capillary pump are distributed along a central delivery channel with a large dimension providing low capillary pressure such that the side channels are filled preferentially, wherein said central delivery channel comprises posts in a middle of the central delivery channel for guiding the fluid into the side-channels; and wherein a cross-section of the side-channel is reduced at an end of said channel such as to form a capillary retention valve and retain the fluid within the side channel; and a single loading site connected to the flow channels of each of the capillary systems.

* * * * *